Aug. 28, 1962 L. VON REPPERT 3,050,772
MANUFACTURE OF GRANULATED FERTILIZERS
Filed June 27, 1960 2 Sheets-Sheet 1
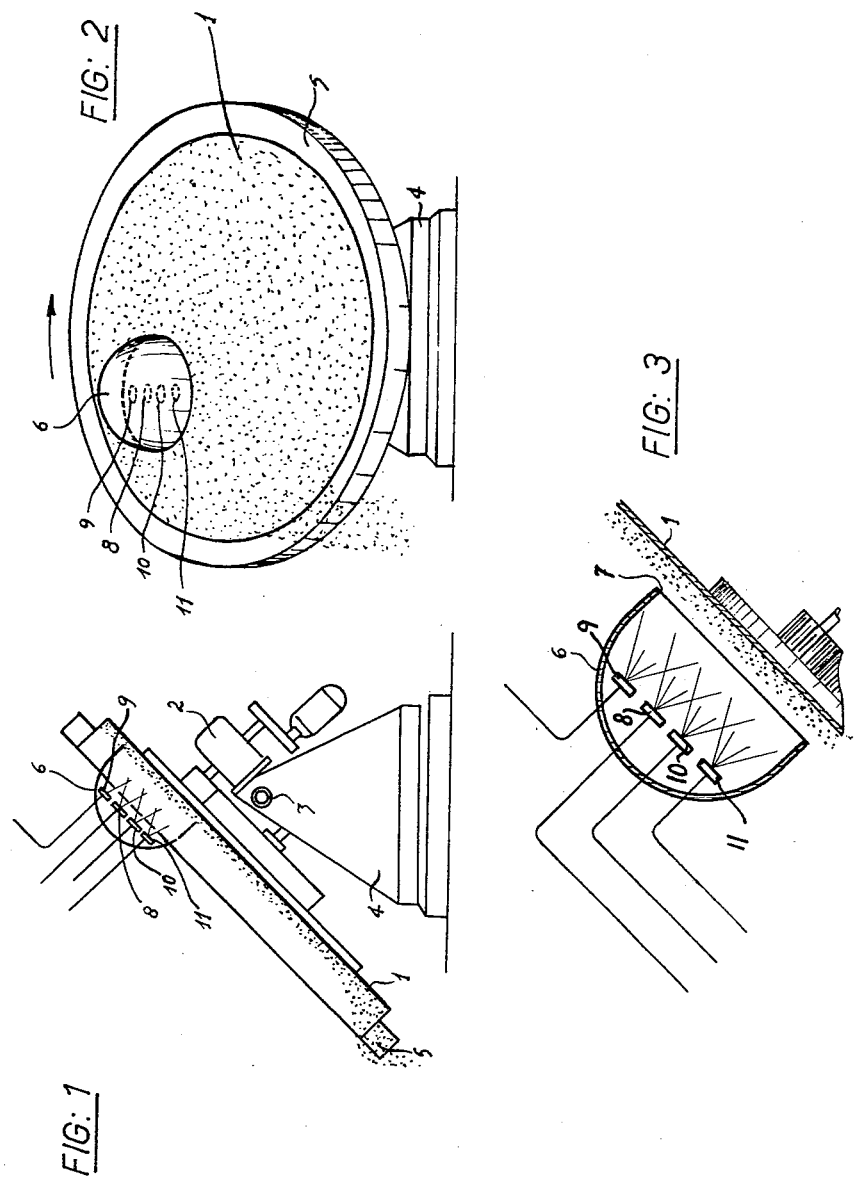
INVENTOR
LOTHAR VON REPPERT
By Irwin S. Thompson
ATTY

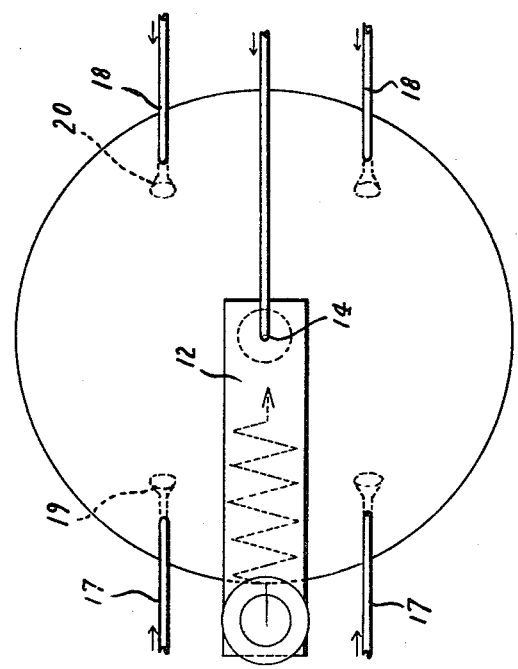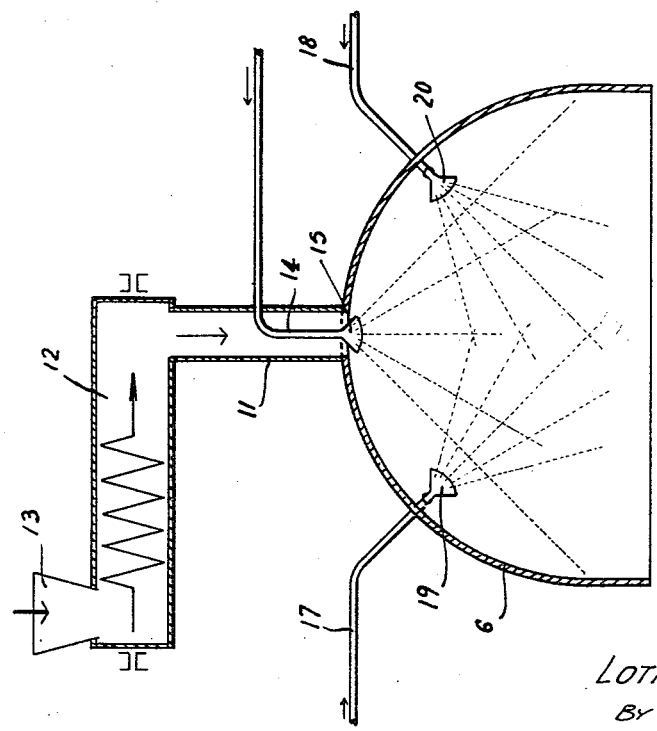

United States Patent Office 3,050,772
Patented Aug. 28, 1962

3,050,772
MANUFACTURE OF GRANULATED FERTILIZERS
Lothar von Reppert, Wiesbaden, Germany, assignor to Düngemittel Technik A.G., Basel, Switzerland, a corporation of Switzerland
Filed June 27, 1960, Ser. No. 39,019
Claims priority, application Germany June 30, 1959
5 Claims. (Cl. 18—1)

The present invention relates to the manufacture of simple or complex fertilizers in granulated form, which is the form at present preferred by users.

It is known that a convenient method of effecting the granulation consists in placing the fertilizer in the form of a fine powder in a tray-type rotary granulator and to project a suitable liquid, in particular an acid, on to the said fertilizer powder. By the reaction of the acid on the product together with the evolution of heat which vaporizes the excess water, and at the same time by the agglomeration of the particles as a result of the rotation of the granulator, dry and stable granules are collected which lend themselves to storage and transport.

The granulation process referred to above is often employed to add to the fertilizer additional compounds, especially nitrogenous compounds. This addition is effected by projecting an ammoniacal solution onto the material placed in the granulator. When mixed with the fertilizer, the said ammoniacal solution encounters acid elements and the reaction product constitutes the additional element intended to be employed in the complex fertilizers to be obtained.

The present invention has for its object an improvement in this process of manufacture of simple or complex fertilizers in a granulator.

The invention consists in introducing acid or auxiliary products, not by projection in the granulator, but in the interior of a fixed bell, the opening of which is disposed in the vicinity of the bottom of the granulator.

Consequently, instead of being slowly distributed in the mass, the auxiliary products enter immediately into reaction. They act subsequently as granulation elements. Greater effectiveness is thus obtained, without loss.

In particular, when it is required to produce complex fertilizers, the addition of auxiliary elements is effected in a simple and convenient manner at the same time as the granulation.

The constitutent elements of the auxiliary products are admitted into the reaction bell in a finely divided form, thereby producing an intimate mixture which is favorable to the reaction. The combination of the said elements with the fertilizer already introduced in the granulator is carried out under good conditions.

In particular, the phosphates or sulphates are advantageously completed in this manner by the addition of ammoniacal compounds. The ammonia is admitted into the bell in the form of a liquid or a gas. An aqueous solution of ammonia or ammoniacal salts can be employed, together with a urea solution if so desired.

At the same time, a finely divided acid is admitted into the bell. This acid can be concentrated or dilute sulphuric acid, phosphoric acid, nitric acid, used either separately or in mixtures.

In order to obtain a good reaction of the ammoniacal products with the acid, nozzles for the admission of the said products are placed close to each other in the reaction bell. The sprayed elements thus enter immediately into reaction in the vicinity of the basic fertilizer already placed in the granulator, thereby assisting the formation of the complex fertilizer at the same time as its granulation.

There can also be admitted into the reaction bell a solid product, particularly one of the constituents of the complex fertilizer such as a phosphate or even the entire quantity of fertilizer to be granulated. This product is projected into the bell in the form of a powdery cloud and is put into reaction together with the other constituents admitted in the divided state, especially with the acid.

The method of operation in accordance with the present invention can be applied to the manufacture of all simple or complex fertilizers having as a base either phosphate, sulphates or other compounds. It also permits the use of various products and in particular residues of manufacture, such as residues from the manufacture of phosphoric acid. These products are composed of sulphates which are similar to plaster, and which contain various useful elements having a base of phosphorus, etc. Such waste products as these are not generally considered to be usable. By treating them in accordance with the present invention, they are restored to usefulness and the difficulties involved in evacuating residues of this kind (contamination of rivers among others) are thereby avoided.

The accompanying drawings illustrate the practical operation of the present invention.

FIG. 1 is a view partly in side-elevation and partly in cross-section of the granulator equipped with the reaction bell.

FIG. 2 is a front view of the granulator.

FIG. 3 is a view in cross-section on a larger scale of the reaction bell.

FIG. 4 is a view in cross-section of an alternative form of the reaction bell.

FIG. 5 is a view seen from above corresponding to FIG. 4.

As can be seen in FIGS. 1 and 2, the granulator is constituted by a rotating tray 1 driven by a mechanism 2. The unit system is pivotally mounted on the shaft 3 of the frame 4.

The plate or tray proper 1 comprises an annular ring 5 which receives the formed granules before they are evacuated. This granulator can be provided with suitable scrapers which are not shown in the drawings.

In accordance with the present invention, a reaction bell 6 is associated with the granulator described above. This bell 6 is fixed and stationary. Its opening 7 is disposed in the vicinity of the tray 1 at a small distance from this latter (FIGS. 1 and 3).

Various pipes supplying the reaction products through nozzles in the form of a divided spray, open into the bell 6. The ammonia nozzle is shown at 8, the acid nozzles are shown at 9 and 10 and a water spray-nozzle is shown at 11.

The granulator, when filled with a powdered fertilizer such as a finely powdered phosphate, is set in rotation. The various auxiliary components, ammonia, acids, water, are admitted through the nozzles 8 to 11. These components are projected in the divided state into the bell 6 and enter immediately into reaction and fall onto the powdered fertilizer, thereby playing the part of a granulation liquid in respect of the said powdered fertilizer. It is therefore a complex fertilizer, humidified by the ammoniacal compound which is then carried away by the tray 1 out of the bell 6 and completes its granulation treatment in the tray before escaping into the ring 5 and passing out of the granulator.

The ammonia nozzle 8 is preferably mounted in proximity to the acid nozzles 9 and 10. The fine mists produced by the nozzles interpenetrate each other immediately and intimately, thereby ensuring a very rapid reaction. The spray-nozzles can be designed to be simultaneously supplied with two or more substances. Experience has shown that the treatment is effected completely without loss of ammonia. When the fertilizer has a phosphate base, the solubility is unmodified: The content of phosphoric acid soluble in water and in ammonium citrate is wholly preserved. The treatment can be carried out with either large or small concentrations of ammonia: it is thus possible to employ inexpensive sources of nitrogen such as ammoniacal waste liquids.

The heat of the reaction of ammonia with the acid produces an intense vaporization of the water and produces a high degree of desiccation of the granulated product. The possibilities of storage of the granulated complex fertilizers thus obtained are thereby improved. To this end, it is useful to subject the said granules to a suitable cooling treatment as they pass out of the granulator. This cooling process can be effected by blowing cold air onto the granule-sorting tray. It is also beneficial to provide the granules with a surface coating of powdered fertilizer. By these means, the risk of agglomeration of the granules during storage is avoided.

In the alternative forms of FIGS. 4 and 5, the reaction bell is arranged to receive all or a portion of the powdered granular fertilizer. The conduit 11, which is coupled to a screw distributor 12, is fixed to the pole or summit of the bell 6, which has a hemispherical or similar shape. The said distributor 12 receives the powdered fertilizer by means of a hopper at 13 and then conveys the fertilizer to the conduit 11 and to the bell 6. The distributor 12 can be replaced by a vibrating conduit or a pneumatic device.

A pipe 14 of compressed air opens into the extremity of the conduit 11 in the vicinity of the pole of the bell 6 and produces through a suitable nozzle 15 a jet, which is preferably conical, and which produces the division of the fertilizer supplied through the conduit 11.

The acid and the ammonia are conveyed into the bell through pipes 17, 18 which terminate in spray-nozzles 19, 20. The jet units formed by the nozzles 19, 20 intersect with each other, and with the jet 15 which projects the powdered fertilizer.

EXAMPLES

Example 1

Into a reaction chamber having the shape of a bell and mounted at a small distance above the bottom of a tray-type granulator there are introduced in a fine spray by means of nozzles, 14.5 parts of an ammoniacal solution containing ammonium nitrate (totalling 41% nitrogen) and 8 parts of sulphuric acid of 78% purity. The parts are expressed by weight. The reaction mixture is projected onto the product which rotates in the granulator and which is composed of:

24 parts of superphosphate of 18% purity
12.5 parts of triple superphosphate of 45% purity
19 parts of ammonia sulphate of 21% purity
25 parts of potassium chloride of 60% purity The neutralization heat is sufficient to produce substantial heating of the entire quantity of material rotating in the granulator, thereby producing rapid evaporation of the water by the air. The granules leave the apparatus and, after subsequent cooling (effected at the time of the grading process during which air is blown from the bottom to the top through the vibrating screen), the said granules are hard and dry. A granulated complex fertilizer of 10/10/15 is thus obtained having a content of 5% of water.

Example 2

Waste material from the manufacture of phosphoric acid consisting of a kind of plaster, containing:

80.9% of calcium sulphate
2.1% of phosphoric anhydride
15.2% of humidity are collected from the factory slag-heap and ground to fine powder. This ground product is introduced in the tray-type granulator illustrated in FIGS. 1 to 3 at the rate of 10,000 kilograms per hour. Into the reaction bell 6, 1200 kilograms of a solution of ammonium nitrate are introduced through the nozzle 8 and 1097 kilograms of sulphuric acid of 78% purity are introduced through the nozzle 9.

Approximately 10 tons of granulated material are thus obtained containing:

N _____ 5%.
$P_2O_5$ _____ 2% soluble in citrate.
$H_2O$ _____ 8%.

which constitutes an inexpensive nitrogenous fertilizer which can be stored and transported without being impaired.

Example 3

A residue from the manufacture of washed and partially dried phosphoric acid is employed as the starting material. This residue contains:

| | Percent |
|---|---|
| Water | 18.5 |
| $P_2O_5$ | 1.5 |
| $CaSO_4$ | 78.4 |

Five tons of this product are passed into the tray-type granulator, while 600 kilograms of ammonia and 2470 kilograms of a mixture of acids containing 70% of sulphuric acid and 5% of phosphoric acid are introduced in the reaction bell.

After an intense vaporization of the water, approximately 5 tons of a granulated fertilizer are obtained comprising:

10% nitrogen
4% $P_2O_5$ soluble in water and in citrate
6.5% humidity

Example 4

Into a tray-type granulator, 10 tons of superphosphate containing 18.7% of ordinary $P_2O_5$, 17.8% of $P_2O_5$ soluble in citrate and 17.4% of $P_2O_5$ soluble in water, 5.8% of free acid and 11.5% water, are introduced per hour.

285 kilograms per hour of finely divided Moroccan phosphate are blown into the reaction bell. The fineness of the phosphate is such that 90% passes through a screen of 1600 meshes per square centimetre. This spraying is effected in such manner that the finely powdered phosphate forms a kind of mist. At the same time, 240 kilograms of sulphuric acid of 78% purity are finely sprayed into the bell, thus forming a cloud which mixes with the mist of phosphate.

The product of the mixture effected in the bell falls on to the superphosphate as it falls into the granulator and mixes with the said superphosphate. The entire mass heats up and the water evaporates.

The granules thus obtained after screening and cooling have a particularly dry external surface. The content of these granules has the following analysis:

19% of ordinary $P_2O_5$
18.4% of $P_2O_5$ soluble in citrate
17.8% of $P_2O_5$ soluble in water
3.8% of free acid
8.6% of water It will be observed that the content of $P_2O_5$ is increased whilst the content of free acid and of water is reduced with respect to the starting elements.

What I claim is:

1. In a granulator device of the rotating type for the granulation of powdered fertilizers, comprising a frame, a rotatable tray mounted on said frame, means mounted on said frame and said tray for rotating said tray, a bell-shaped member mounted above said tray and in proximity therewith, an opening disposed in said bell-shaped member and parallelly arranged with respect to said tray, and admission members arranged in said bell-shaped member for supplying materials to said tray.

2. In a granulator device according to claim 1 in which projection nozzles are arranged on said admission members to provide crossed jets of materials on the interior of said bell-shaped member.

3. In a granulator device according to claim 1 in which one of the admission members consists of a conduit connected to said bell-shaped member for supplying powdered fertilizer to be treated to the interior of said bell-shaped member.

4. In a granulator device according to claim 3 in which a screw distributor is disposed in said conduit to supply said conduit with powdered fertilizer, a pipe for compressed air is mounted in said conduit at the junction of the connection of said conduit and bell-shaped member, and a nozzle is mounted on said pipe for providing a conical jet of air to distribute the powdered fertilizer on the interior of said bell-shaped member.

5. In a granulator of the type having a rotating tray for the granulation of powdered fertilizer, comprising a frame, a tray rotatably mounted on said frame, means for driving said tray in rotation, a bell-shaped member mounted above said tray and in proximity thereto, said bell having its opening parallel to said tray, liquid admission members disposed in said bell-shaped member for delivering liquid to effect granulation into said bell-shaped member, a distributor of powdered fertilizer coupled to said bell-shaped member, means connected to said distributor for the admission of compressed air therein including a spraying device delivering a conical jet of air and carrying the powdered fertilizer into said bell-shaped member.

References Cited in the file of this patent

UNITED STATES PATENTS

| | | |
|---|---|---|
| 2,860,598 | Loesche | Nov. 18, 1958 |
| 2,946,666 | Eymann | July 26, 1960 |

FOREIGN PATENTS

| | | |
|---|---|---|
| 1,117,210 | France | May 18, 1956 |
| 193,908 | Austria | Dec. 10, 1957 |